United States Patent [19]

Ohsumi

[11] Patent Number: 5,658,981
[45] Date of Patent: Aug. 19, 1997

[54] THERMOREVERSIBLE THICKENER

[75] Inventor: Tatsuya Ohsumi, Kyoto, Japan

[73] Assignee: Sanyo Chemical Industries, Ltd., Kyoto, Japan

[21] Appl. No.: 590,875

[22] Filed: Jan. 24, 1996

Related U.S. Application Data

[63] Continuation of Ser. No. 196,112, filed as PCT/JP93/01445, Oct. 7, 1993, abandoned.

[51] Int. Cl.$^6$ .................... C08F 26/00; C08L 31/00
[52] U.S. Cl. .................... 524/555; 526/260; 526/263; 526/265
[58] Field of Search .................... 524/555; 526/217, 526/236, 258, 260, 263, 265, 319

[56] References Cited

U.S. PATENT DOCUMENTS

| | | | |
|---|---|---|---|
| 3,985,698 | 10/1976 | Matsudaira et al. | 524/501 |
| 4,318,956 | 3/1982 | Stevens et al. | 524/555 |
| 4,521,552 | 6/1985 | Schnee et al. | 524/555 |
| 4,892,916 | 1/1990 | Hawe et al. | 526/304 |
| 5,102,936 | 4/1992 | Huth et al. | 524/555 |
| 5,484,610 | 1/1996 | Bae | 526/263 |

FOREIGN PATENT DOCUMENTS

| | | |
|---|---|---|
| 0027850 | 5/1981 | European Pat. Off. |
| 0359349 | 3/1990 | European Pat. Off. |
| 56-32511 | 4/1981 | Japan |
| 62-57408 | 3/1987 | Japan |
| 64-14276 | 1/1989 | Japan |
| 2-75682 | 3/1990 | Japan |

OTHER PUBLICATIONS

English Abstract of JP-A-2-75682 (original filed on 17 Feb. 1994).

Translation of claims of JP-A-56-32511 (original filed on 17 Feb. 1994).

Fu–Mian Li, "Vinyl Minomers Having Chromophore Moities . . . ", Polymer Preprints, (Japan) vol. 40 No. 5 P1521–1523.

*Primary Examiner*—Tae Yoon
*Attorney, Agent, or Firm*—Birch, Stewart, Kolasch & Birch

[57] ABSTRACT

A thermoreversible thickener comprising a water-soluble copolymer containing as constituent monomer at least 50% by weight of a vinyl carboxylic ester of a cylic amine or a non-cyclic amine with at least 5 carbons with an alkylene oxide added thereto. The thickener, with a transition temperature which can be easily controlled according to the purpose of application such as coating, rolling oil, adhesives or inks, has a characteristic such that heating the aqueous solution thereof up to a temperature above the transition temperature causes rapid thickening of the solution.

35 Claims, No Drawings

THERMOREVERSIBLE THICKENER

This application is a continuation of application Ser. No. 08/196,112 filed on Nov. 18, 1994, now abandoned, which is a 371 of PCT/JP93/01445 filed on Oct. 7, 1993.

BACKGROUND OF THE INVENTION

This invention relates to a thermoreversible thickener, more particularly to a thermoreversible thickener which is compounded with aqueous liquids such as water, aqueous solutions of water-soluble compounds, aqueous solutions of water-soluble resins, aqueous dispersions of inorganic substances, and aqueous dispersions of organic substances like latices and emulsions of various resins, and also to compositions compounded with the thermoreversible thickener such as coating compositions, rolling oil compositions, adhesives, printing inks, coating materials for coated papers, binders for nonwoven fabrics and adhesives for carpet backing.

DESCRIPTION OF THE RELATED ART

Previously, methyl cellulose has been known as a thermoreversible thickener which has the characteristic that the viscosity of an aqueous liquid admixed therewith exhibits a rapid increase in viscosity above a certain transition temperature, and has been widely applied to uses such as coating compositions and printing inks. Recently EP No. 359349 discloses N-alkyl acrylamide polymers as thermoreversible thickeners. However, methyl cellulose thickeners have a disadvantage in that the aqueous compositions compounded therewith have difficulty in optionally controlling the temperature at which the composition begins to increase in viscosity, and that the viscosity increase thereof is not rapid even though the temperature is raised above the transition temperature. On the part of the N-alkyl acrylamide polymers, various N-alkyl acrylamides with different alkyl groups have to be prepared as starting materials in order to attain optional transition temperatures of the polymers obtained.

SUMMARY OF THE INVENTION

The object of the invention is to provide a thermoreversible thickener for aqueous liquids with a transition temperature which can be easily controlled according to the intended application of the aqueous liquid and which thicken rapidly within a narrow temperature range above the transition temperature, and to provide compositions such as coating materials and printing inks with transition temperatures which can be controlled easily and which thicken rapidly within a narrow temperature range above the transition temperature.

As the results of our researches to strive for the object, we have eventually attained the present invention finding that a water-soluble copolymer containing as constituent monomer a vinyl carboxylic ester of an alkylene oxide adduct of a cyclic amine, or a vinyl carboxylic ester of an alkylene oxide adduct of a non-cyclic amine with at least 5 carbons, when admixed with an aqueous liquid the viscosity of which is to be controlled, causes initially a decrease in the viscosity thereof as the temperature is increased in the range below a certain transition temperature, while causing a rapid increase in the viscosity thereof at a temperature above the transition temperature. Further we have found that the thickening characteristic of the aqueous composition is thermoreversible, namely, the viscosity of the composition undergoes a reversible change with the change in the temperature thereof, and that the transition temperature of the thermoreversible thickener can be easily controlled at optional temperatures by varying the kinds and the moles of the alkylene oxides added in the above-mentioned esters constituting the copolymers, or by controlling the kinds and the copolymerization ratios of the comonomers constituting the copolymers.

Accordingly, the invention provides a thermoreversible thickener comprising a water-soluble copolymer containing as constituent monomers at least 50% by weight of a vinyl carboxylic ester of an alkylene oxide adduct of a cyclic amine or a non-cyclic amine with at least 5 carbons, and a variety of compositions admixed with the thickener such as coating materials and printing inks containing from 0.01 to 30% by weight of the above-mentioned thermoreversible thickener. As it is used herein, the phrase "transition temperature" refers to a temperature at which the thermoreversible thickener of the invention begins to increase in viscosity as the temperature thereof is increased, namely, a temperature at which the above-mentioned copolymer exhibits a transition from hydrophilicity to hydrophobicity or, reversibly, from hydrophobicity to hydrophilicity. The transition temperature may be compared to the cloud point of nonionic surface active agents.

DETAILED DESCRIPTION OF THE INVENTION

The present invention may be embodied in detail in the following by way of typical examples. First of all, the materials constituting the thermoreversible thickeners of this invention are embodied.

Cyclic amines used herein may include any cyclic amine with active hydrogen atoms to which alkylene oxides are added, namely, any compound with amine nitrogens inside or outside the ring. Active hydrogen may derive from amino groups, or such groups as hydroxy and carboxyl groups, to which alkylene oxide can be added. Examples of such cyclic amines are non-aromatic heterocyclic amines including those with an aziridine ring such as aziridine, 2-methyl aziridine and 2-ethyl aziridine, those with a pyrrolidine ring such as pyrrolidine, 2-methyl pyrrolidine, 2-ethyl pyrrolidine, 2-pyrrolidone, succinimide and 1,2-cyclohexane dicarboxylimide, those with a piperidine ring such as piperidine, 2-methyl piperidine, 3,5-dimethyl piperidine, 2-ethyl piperidine, 4-piperidinopiperidine, 2-methyl-4-pyrrolidinopiperidine and ethyl pipecolinate, those with piperazine ring such as 1-methyl piperazine and 1-methyl-3-ethyl piperazine, those with a morpholine ring such as morpholine, 2-methyl morpholine, 3,5-dimethyl morpholine and thiomorpholine, pyrrolines such as 3-pyrroline, 2,5-dimethyl-3-pyrroline and 2-phenyl-2-pyrroline, pyrazolines such as pyrazoline, imidazoles such as 2-methyl imidazole, 2-ethyl-4-methyl imidazole and 2-phenyl imidazole, pyrazoles such as pyrazole and pyrazole carboxylic acid, pyridones such as α-pyridone and γ-pyridone, and those compounds such as ε-caprolactam, pyridazinone, pyridaline and pyridoin; aromatic heterocyclic amines such as 2-hydroxy pyridine, 2-hydroxy-3,5-di-tert-butyl pyridine, 2-carboxyl pyridine, 4-pyridil carbinol, 2-hydroxypyrimidine, pyrrole and 2-phenyl pyrrole; and aromatic amines such as aniline, 3-methyl aniline, N-methyl aniline and N-isopropyl aniline.

Non-cyclic amines with at least 5 carbons as used herein may include any non-cyclic amine with at least 5 carbons with active hydrogen atoms to which alkylene oxides are added. Examples of such non-cyclic amines are primary aliphatic non-cyclic amines with at least 5 carbons such as dimethylpropyl amine, 2-ethylbutyl amine, pentyl amine, 2,2-dimethylbutyl amine, hexyl amine, cyclohexyl amine, octyl amine, 2-ethylhexyl amine, isodecyl amine and lauryl amine, and secondary aliphatic non-cyclic amines with at least 5 carbons such as methyl butyl amine, methyl isobutyl amine, methyl tert-butyl amine, methyl pentyl amine, methyl hexyl amine, methyl (2-ethylhexyl) amine, methyl octyl amine, methyl nonyl amine, methyl isodecyl amine, ethyl propyl amine, ethyl isopropyl amine, ethyl butyl amine, ethyl isobutyl amine, ethyl tert-butyl amine, ethyl pentyl amine, ethyl hexyl amine, ethyl (2-ethylhexyl) amine, ethyl octyl amine, dipropyl amine, diisopropyl amine, propyl butyl amine, propyl isobutyl amine, propyl tert-butyl amine, propyl pentyl amine, propyl hexyl amine, propyl (2-ethylhexyl) amine, propyl octyl amine, isopropyl butyl amine, isopropyl isobutyl amine, isopropyl tert-butyl amine, isopropyl pentyl amine, isopropyl hexyl amine, isopropyl (2-ethylhexyl) amine, isopropyl octyl amine, dibutyl amine, diisobutyl amine, di-tert-butyl amine, butyl pentyl amine, dipentyl amine, dicyclohexyl amine.

Among such cyclic amines mentioned above, non-aromatic cyclic amines are preferable, those with a piperidine ring or morpholine ring are more preferable, and those with a morpholine ring are most preferable. Among such non-cyclic amines with at least 5 carbons primary aliphatic non-cyclic amines with 5 to 8 carbons are preferable.

Typical examples of alkylene oxide include etylene oxide, propylene oxide and burylone oxide, among which ethylene oxide or propylene oxide, and combinations thereof are preferable.

The transition temperature of the thickener of the invention can be easily controlled by varying the kinds and the moles of alkylene oxide added in the above-mentioned vinyl carboxylic esters. The transition temperature can be determined by measuring the temperature at which the copolymer exhibits a change from hydrophilicity to hydrophobicity or, reversibly, from hydrophobicity to hydrophilicity, for example, by measuring the temperature at which a 1% aqueous solution of a water-soluble copolymer begins clouding as the temperature thereof is gradually increased, or by measuring the temperature at which a 20% aqueous solution by weight of the copolymer begins to increase in viscosity as the temperature thereof is gradually increased.

As to the kind of alkylene oxide, when ethylene oxide is used, the transition temperature of the thickener becomes higher as the mole of addition thereof is increased, however, when propylene oxide or butylene oxide is used, the transition temperature becomes lower as the mole of addition thereof is increased. The mole of addition of the alkylene oxide, which is selected in accordance with the desired transition temperature, the kind of cyclic amines or non-cyclic amines with at least 5 carbons, and the kind of alkylene oxides, usually ranges from 1 to 50 moles, preferably from 1 to 5 moles. Furthermore, the mole of addition of alkylene oxide to primary amines with at least 5 carbons may preferably range from 2 to 5 moles.

As to vinyl carboxylic acids, any compounds which give vinyl carboxylic esters by reacting with alkylene oxide addition compounds may be selected, for example, (meth) acrylic acid, (iso)crotonic acid, maleic acid, fumaric acid, itaconic acid, vinyl benzoic acid, and the ester forming derivatives thereof such as acid anhydrides, acid halides and methyl esters. Among the vinyl carboxylic acids mentioned above, (meth)acrylic acid, maleic acid, vinyl benzoic acid, and the ester forming derivatives thereof may be preferable, (meth) acrylic acid and the ester forming derivatives thereof being particularly preferable.

The copolymers used in the invention include copolymers of at least two kinds of vinyl carboxylic esters derived from the different members of the above-mentioned amines, and copolymers containing as constituent comonomer vinyl monomers which are different from the above-mentioned vinyl carboxylic esters.

As the comonomer constituting the copolymers any copolymerizable vinyl monomer, either hydrophilic or oleophilic, may be used. Examples of hydrophilic vinyl monomers include nonionic compounds such as hydroxyethyl (meth) acrylate, diethylene glycol mono(meth)acrylate, polyethylene glycol mono(meth)acrylate, (meth)acryloyloxy polyglycerol, vinyl alcohol, allyl alcohol, (meth)acrylamide, N-methyl (meth)acrylamide, N-methylol (meth)acrylamide, N-vinyl-2-pyrrolidone, vinyl imidazole, N-vinyl-ε-caprolactam, p-methane sulfonamide styrene, N-methylol maleimide, N-vinyl succinimide, p-aminostylene, N-vinyl carbazole, 2-vinyl pyridine and 2-cyanoethyl(meth)acrylate; anionic compounds such as (meth)acrylic acid, maleic acid (anhydride), fumaric acid, itaconic acid, vinyl sulfonic acid, (meth)allyl sulfonic acid, styrene sulfonic acid, vinyl benzoic acid, alkylallyl sulfosuccinic ester and (meth)acryloyl polyoxyalkylene sulfuric ester, and salts of these acids; cationic compounds such as N,N-dimethylaminoethyl (meth)acrylate, N,N-dimethylaminopropyl (meth)-acrylate, N,N-diethylaminoethyl (meth)acrylate, N,N-diethylaminopropyl (meth)acrylate, N,N-dimethylaminoethyl (meth)acrylamide and vinyl aniline, and salts of these amines; compounds with aminimide group such as 1,1,1-trimethylamine (meth)acrylimide, 1,1-dimethyl-1-ethylamine (meth)acrylimide, 1,1-dimethyl-1-(2-hydroxypropyl)amine (meth)acrylimide, 1,1-dimethyl-1-(2'-phenyl-2'-hydroxyethyl)amine (meth)acrylimide and 1,1,1-trimethylamine (meth)acrylimide.

Examples of oleophilic vinyl monomers include (meth) acrylate derivatives such as methyl (meth)acrylate, ethyl (meth)acrylate, butyl (meth)acrylate, cyclohexyl (meth) acrylate, lauryl methacrylate, octadecyl methacrylate and glycidyl (meth)acrylate, N-alkyl (meth)acrylamide derivatives such as N,N-dibutyl (meth)acrylamide and N-cyclohexyl (meth)acrylamide, (meth)acrylonitrile, styrene, 1-methyl styrene, vinyl acetate, butadiene, chlorovinyl butadiene and isoprene.

The copolymers used in the invention and the method of preparation thereof will be embodied in the following. The transition, temperature of the copolymers is easily controlled by varying the kinds and the amounts of the above-mentioned comonomers. More specifically, the use of a hydrophilic vinyl monomer as comonomer induces a tendency to increase the transition temperature of the copolymer, the larger the fraction of the hydrophilic vinyl monomer the higher the transition temperature, the tendency becoming more remarkable with the increase in hydrophilicity of the hydrophilic vinyl monomer. Conversely, the use of an oleophilic vinyl monomer induces a tendency to decrease the transition temperature of the copolymer, the larger the fraction of oleophilic vinyl monomer the lower the transition temperature, the tendency becoming more remarkable with the increase in oleophilicity of the oleophilic vinyl monomer.

The copolymer should contain usually at least 50% by weight, preferably at least 70% by weight, of vinyl carboxylic esters as constituent monomer. When the amount of the vinyl carboxylic ester contained in the copolymer is too small, the change in viscosity thereof with temperature is not prominent. The weight-average molecular weight of the copolymer ranges usually from 1,000 to 5,000,000, preferably from 10,000 to 2,000,000, and most preferably from 100,000 to 1,000,000.

The copolymer of the invention is prepared by the radical polymerization of the vinyl carboxylic ester with the above-mentioned comonomers according to need. The polymerization can be carried out by any of the usual thermal polymerization methods such as solution polymerization, bulk polymerization, emulsion polymerization and suspension polymerization, the copolymer being obtained by initiating the polymerization reaction by any of the methods including heating in the presence of a radical polymerization initiator, irradiation with light in the presence of a photosensitizer, or irradiation with high-energy radiation. The temperature of the polymerization reaction ranges usually from 20° to 350 ° C., preferably from 50° to 150° C., and the pressure of the reaction ranges usually from atmospheric pressure to 20 atm., preferably from atmospheric pressure to 10 atm.

The radical polymerization initiator may be those usually used for radical polymerization. Examples of the radical polymerization initiator include azo compounds such as 2,2'-azobis(dimethyl valeronitrile), 2,2'-azobis (isobutyronitrile), 4,4'-azobis(4-cyanopentanoic acid), 2,2'-azobis(2-amidinopropane) hydrochloride, azobis(2-methyl-N-bishydroxymethyl-2-hydroxyethyl propionamide) and azobis(2-methyl-N-hydroxyethyl propionamide), and peroxide compounds such as ammonium persulfate, sodium persulfate, hydrogen peroxide, benzoyl peroxide, lauryl peroxide, tert-butyl hydroperoxide, dicumyl peroxide, di-tert-butyl peroxide and cumenehydroperoxide. Chain transfer agents such as lauryl mercaptan and mercaptoethanol may be used according to need.

The transition temperature of the copoymers may be controlled in accordance with the intended application and the object composition to be thickened; being usually controlled in the range from 5° to 95° C., preferably 30° to 95° C.

The thermoreversible thickener of the invention may be admixed with antioxidants, ultraviolet absorbers, water-resistance improvers, perfumes, antifoam agents and dyes according to need.

The thermoreversible thickener of the invention may be used either as pulverized solids or as solutions of arbitrary concentrations. Solvents suitable for the thickener may be water, acetone, methyl ethyl ketone, ethyl acetate, tetrahydrofuran, dioxane, methanol, isopropyl alcohol, acetonitrile and toluene.

The thickener of the invention, when admixed with an aqueous liquid, is useful for controlling the characteristic thermoreversible viscosity change thereof, thickening and finally gelling as the temperature is increased. The thickener of the invention can be used for controlling the viscosity of an aqueous liquid of a wide pH range, being useful for an aqueous liquid in the pH range from 3 to 12, particularly in the range from 5 to 10.

Furthermore, the composition of the thickener of the invention and the practical application thereof will be explained. The composition of the thickener comprises from 0.01 to 30% by weight of the above-mentioned thickener and from 70 to 99.99% by weight of an aqueous solution, emulsion or dispersion, namely as aqueous liquid, of inorganic or organic substances. The aqueous liquid includes water, aqueous solutions of water-soluble compounds, aqueous solutions of water-soluble resins, aqueous dispersions of inorganic compounds and aqueous dispersions of organic compounds. The amounts of the thickener in the composition of the invention may be determined in accordance with the kind, the solid content and the viscosity of the aqueous liquid which is to be admixed thereof, being usually from 0.01 to 30 parts by weight, preferably from 0.05 to 20 parts by weight on 100 parts by weight based of the aqueous liquid.

The composition of the thickener of the invention is prepared by admixing the thickener with an aqueous liquid at a temperature below the transition temperature thereof. The transition temperature may be measured in advance with reference to the aqueous liquid to be used, as the transition temperature tends to vary with the kind and the amount of the components in the aqueous liquid such as salts, surface active agents and solvents.

Any organic compounds may be contained in the aqueous liquid. Examples of the organic compounds to be used include food additives such as ammonium carbonate and sodium alginate, perfumes such as vanillin, sugars such as glucose and cane sugar, vitamins such as vitamin B1 and vitamin C, dyes including basic dyes such as polymethyne, azo, azamethyne and anthraquinone dyes, acidic dyes such as metal complex dyes, and reactive dyes such as triazine and amide dyes, organic pigments such as nitroso, nitro, azo and phthalocyanine pigments, surface active agents such as nonionic surface active agents, fats and oils such as natural fats and oils, fatty acids from fats and oils, fatty acid soap and fatty acids from hydrogenated fats and oils, waxes such as paraffin wax, polyethylene wax, modified polyethylene wax and polypropylene wax, and other publicly known water-soluble low molecular-weight compounds.

Furthermore, examples of other organic compounds include natural polymers such as gelatin, starch, cellulose and natural rubber, synthetic polymers such as sodium polyacrylates, acrylamide polymers, polyvinyl alcohols, acrylic resins, alkyd resins, melamine resins, urethane resins, polyethylene oxides, polyethylene imines, urea-formaldehyde resins, cationized starch, methyl cellulose, maleic acid resins, polyvinyl pyrrolidones, SBR, NBR, epoxy resins, polyvinyl acetate, vinyl acetate-acrylic copolymers, ethylenevinyl acetate copolymers, acryl silicone resins and polyester resins, and other publicly known water-soluble or water-dispersive resins.

Examples of inorganic substances to be admixed with the aqueous liquid include dispersions of inorganic pigments such as carbon black, iron oxide, titanium oxide, zinc white, cobalt blue, calcium carbonate, chrome yellow, alumina white, zinc sulfide, vermilion, molybdenum red, clay, ultramarine and Berlin blue, and colloidal, silicas, glass fibers, ceramic powders, cement, coal and talc.

As to aqueous dispersions of organic substances any dispersions, latices or emulsions of the above-mentioned organic substances are used.

Examples of the practical applications of the thickener compositions of the invention include coating material compositions, rolling oil compositions, adhesive bonding agents, printing inks, coating materials for coated papers, binders for nonwoven fabrics and adhesive for carpet backing of the invention. Furthermore, the thickener compositions of the invention may be used for textile printing sizes, oils for metals, or cosmetics, concrete, resin concrete, binders for ceramics and binders for glass fibers.

Among many applications of the compositions mentioned above, the preparation of the coating material composition of the invention is carried out usually by adding to 100 parts of an acrylic resin emulsion, a urethane resin emulsion, an epoxy resin emulsion or SBR latex, from 20 to 300 parts of pigments such as have been explained above as inorganic pigments or organic pigments, from 0 to 10 parts of pigment dispersing agents such as sodium polyacrylate, other additives for aqueous coating materials such as anti-sagging agents, thickeners, antifreezing agents, anti-foaming agents, preservatives, drying agents and leveling agents, and water as it is required, the admixture then being dispersed by the use of a dispersing machine such as a ball mill, a sand mill, a high-speed disperser and a paint conditioner and made into an emulsion coating material. The coating material composition of the invention is then prepared by adding onto the emulsion coating material obtained above, which contains from 10 to 80% of solids constituent, from 0.01 to 30% by weight of the thickener of the invention at a temperature below the transition temperature thereof, and agitating and uniformly mixing the admixture. The coating material composition thus obtained is usually applied onto substrates such as glasses, metals, plastics and papers by using a paint brush or a roll coater, a curtain flow coater and an applicator from 0.1 to 500 μm in thickness, then dried by heating at a temperature, from 50° to 150° C., whereby a coating having a good appearance is obtained.

As the coating material compositions of the invention undergoes a rapid thickening and immobilization by heating above the transition temperature thereof, skinning of the coating surface is not induced even by a rapid heat drying after having been coated, thus a coating of a good quality is obtained without apparent surface flaws such as popping caused by migration of the emulsion particles. Furthermore, as the coating material is immobilized without a viscosity decrease by heating, sagging and flowing thereof are suppressed and a coating with a uniform thickness is obtained even when a temperature distribution exits on the coating surface.

The preparation of the rolling oil composition of the invention is carried out by admixing 100 parts of water with from 0.5 to 30 parts of fats and oils used for aqueous rolling oils such as palm oil and beef tallow, from 0.05 to 5 parts of nonionic, cationic or anionic surfactant emulsifiers, from 0.05 to 5 parts of oily substance such as fatty acids, fats and oils or hydrocarbons, from 0.05 to 5 parts of phosphorous or sulfur type extreme-pressure additives and other additives as it is required, emulsifying the admixture by using a homogenizing machine such as a homogenizer and a disperser, thus obtaining an aqueous emulsion. By adding onto the aqueous emulsion thus prepared from 0.01 to 30% by weight of the thickener of the invention at a temperature below the transition temperature thereof, the rolling oil composition of the invention is obtained. By applying the rolling oil composition of the invention onto a rolling mill, the copolymer of the invention, upon contacting with hot metals, separates out thereonto together with the fats and oils, the build-up thereof on the metal surface being increased and the rolling carried out smoothly.

Furthermore, the adhesive bonding agent of the invention is prepared by admixing from 70 to 99.99 parts of an aqueous solution, an emulsion or an aqueous dispersion of the object adhesive bonding agent such as urea resin, melamine resin, phenol resin, α-olefin-maleic anhydride resin, vinyl acetate resin, acrylic resin, SBR, NBR, urethane resin, cellulosics and starches with from 0.01 to 30 parts of the thickener of the invention at a temperature below the transition temperature thereof, adding according to need some curing agents such as melamine resin and multifunctional isocyanates, and plasticizers such as dioctyl phthalate.

The adhesive bonding agent of the invention thus obtained is used by applying a layer of from 0.1 to 1,000 μm in thickness onto one side or both sides of substrate sheets such as wood, paper, cloth, fibers, metals, plastics, plasterboards, bricks, earthenware and glass, followed by laminating the sheets with each other after having been heated at a temperature, for example, from 40° to 150° C., or by heating after the sheets have been laminated with each other. As the adhesive bonding agent becomes thickened and immobilized by heating, the adhesiveness thereof is increased and migration of the constituent particles is suppressed. The particles then become uniformly distributed on the adhesive interface, thereby the adhesive force being increased.

The printing ink of the invention is prepared usually by admixing from 1 to 50 parts of the above-mentioned pigments, either organic or inorganic, or dyes, from 0 to 50 parts of resins such as aqueous melamine-alkyd resin, aqueous maleic acid resin, aqueous urethane resin as a binder for the ink, from 0 to 10 parts of dispersants including nonionic dispersants such as polyvinyl alcohol, anionic dispersants such as sodium polyacrylate and cationic dispersants such as chitosan acetate, from 0 to 50 parts of surface active agents including nonionic surfactants such as polyoxyethylene nonyl phenyl ether, anionic surfactants such as sodium alkyl benzene sulfonate, cationic surfactants such as alkyl trimethyl ammonium chloride and amphoteric surfactants such as alkyl dimethyl betaine, from 0 to 50 parts of solvents including alcohols such as ethanol, ethylene glycol, glycerine and polyethylene glycol, ethers such as butyl cellosolve and butyl carbitol, and ketones such as acetone and methyl ethyl ketone, and other necessary additives such as antifoam agents, preservatives and pH adjusters, with such amount of water as to fix the total amount of from 70 to 99.99 parts of the admixture, adding thereonto from 0.01 to 30 parts of the thickener of the invention at a temperature below the transition temperature thereof, and by mixing uniformly with a mixing machine.

The printing ink of the invention thus obtained is used in printing the materials such as wood, paper, cloth, fibers, metals, plastics, plasterboards, bricks, earthenware and glass, either by printing the materials which have been heated up to a temperature above the transition temperature of the thickener, for example, from 40° to 150° C., or by heating the materials after having been printed at room temperature. By the heating of the materials to be printed or the heating of the printed materials, the composition of the invention becomes thickened and immobilized, thus suppressing the deep penetration of the printing ink into the printed materials, whereby more of the effective ingredients in the composition are kept fixed on the surface, enabling a reduction in the amount of the ink to be used and to attain more articulate and delicate printing.

The coating material for coated paper of the invention is prepared, for example, by admixing from 1 to 30 parts of resin binders used for coating material of coated paper such as SBR latex, NBR latex and acrylic resin emulsion, from 30 to 80 parts of pigments such as calcium carbonate and clay; from 0 to 10 parts of water soluble resins such as starch, from 0 to 10 parts of dispersants including nonionic dispersants such as polyvinyl alcohol, anionic dispersants such as sodium polyacrylate, cationic dispersants such as chitosan acetate, from 0 to 5 parts of surface active agents including nonionic surfactants such as polyoxyethylene nonyl phenyl ether, anionic surfactants such as sodium alkyl benzene sulfonate, cationic surfactants such as alkyl trimethylammonium chloride and amphoteric surfactants such as alkyl dimethyl betaine, and other additives such as antifoam agents, preservatives and pH adjusters, with such amount of water as to fix the total amount of from 70 to 99.99 parts of the admixture, adding thereonto from 0.01 to 30 parts of the thickener of the invention at a temperature below the transition temperature thereof, and by mixing uniformly with a mixing machine.

The coating material for coated paper thus obtained is applied onto coating substrates such as paper and cloth, either by coating the material by an amount, for example, of from 1 to 100 g/m² after the material has been heated up to a temperature above the transition temperature, for example, from 40° to 150° C., or by heating the material up to the previous temperature after having been coated at room temperature. The material can be calendered under ordinary conditions after having been coated according to need. By heating the substrate to be coated or heating the coated susbstrate, the coating material for coated paper of the invention becomes thickened and immobilized, thus suppressing the migration of the constituent particles onto the coated surface, thereby coated paper of highly glossy surface with excellent printability herein obtained.

Furthermore, as to the binder for non-woven fabrics of the invention, the composition useful therefore is prepared by mixing, as the binder for non-woven fabrics, from 5 to 50 parts of resins, for example, SBR latex, NBR latex, acrylic emulsion and urethane emulsion, from 0 to 5 parts of hardeners such as melamine resin, from 0 to 1 part of the above-mentioned surface active agents, and other publicly known additives such as antifoam agents, preservatives and pH adjusters, with such amount of water as to fix the total amount of from 70 to 99.99 parts of the admixture, adding thereonto from 0.01 to 30 parts of the thickener of the invention at a temperature below the transition temperature thereof, and by mixing uniformly with a mixing machine.

The binder for non-woven fabrics thus obtained is applied to the webs for non-woven fabrics such as those obtained from the fibers of wool, polyester, nylon, polypropylene and rayon, by the usual methods such as spray, impregnation, foaming and printing, followed by drying at a temperature from 40° to 150° C. in a drying machine. During the drying process the migration of the resin particles in the composition toward the web surface is suppressed, thereby the binder for non-woven fabrics being distributed uniformly from the surface into the inside thereof, non-woven fabrics of fluffy and good hand is obtained.

The binder for non-woven fabrics mentioned above can also be used for the adhesive for carpet backing. The adhesive for carpet backing is applied to sheets of fibers, obtained from fibers such as polyester, nylon, polypropylene and rayon, by the usual methods such as spray, foaming and printing, followed by heat drying at a temperature from 40° to 150° C. in a drying machine, the sheet thus prepared being used for manufacturing carpets. During the drying process migration of the resin particles in the composition toward the surface of the fiber sheet, whereby carpets of good hand are manufactured.

The invention will be explained in more detail with reference to the following examples of preparation and application; however these examples are intended to illustrate the invention and not to be construed to limit the scope of the invention. As it is used herein, the word "parts" means "parts by weight".

Preparation Example 1

A mixture of 90 parts of 2-morpholinoethyl methacrylate, a methacrylic acid ester of morpholine with 1 mole of ethylene oxide added thereto, 10 parts of methacrylic acid and 0.1 parts of 2,2'-azobis(2,4-dimethyl valeronitrile) was contained in an ampule, which was sealed after deaeration evacuation under freezing of the mixture therein. The mixture was then heated at 50° C. to effect polymerization for 8 hours to obtain copolymer 1. The transition temperature of the copolymer 1 was 74° C.

Preparation Example 2

A mixture of 95 parts of 2-morpholinoethyl methacrylate, a methacrylic acid ester of morpholine with 1 mole of ethylene oxide added thereto, 5 parts of methacrylic acid and 0.1 part of 2,2'-azobis(2,4-dimethyl valeronitrile) was contained in an ampule, which was sealed after deaeration and evacuation under freezing of the mixture therein. The mixture was then heated at 50° C. to effect polymerization for hours to obtain copolymer 2. The transition temperature of the copolymer 2 was 52° C.

Preparation Example 3

A mixture, of 90 parts of 2-morpholinopropyl acrylate, an acrylic acid ester of morpholine with 1 mole of propylene oxide added thereto, 10 parts of hydroxyethyl acrylate and 0.5 part of 2,2'-azobis(2,4-dimethyl valeronitrile) was contained in an ampule, which was sealed after deaeration and evacuation under freezing of the mixture therein. The mixture was then heated at 60° C. to effect polymerization for 8 hours to obtain copolymer 3. The transition temperature of the copolymer 3 was 42° C.

Preparation Example 4

A mixture of 80 parts of 2-(2-piperidinoethoxy)ethyl methacrylate, a methacrylic acid ester of piperidine with 2 moles of ethylene oxide added thereto, 20 parts of N-vinyl pyrrolidone and 0.1 part of 2,2'-azobis(2,4-dimethyl valeronitrile) was contained in an ampule, which was sealed after deaeration and evacuation under freezing of the mixture therein. The mixture was then heated at 50° C. to effect polymerization for 8 hours to obtain copolymer 4. The transition temperature of the copolymer 4 was 58° C.

Preparation Example 5

A mixture of 90 parts of 2-(2-piperidinoethoxy)ethyl methacrylate, a methacrylic acid ester of piperidine with 2 moles of ethylene oxide added thereto, 10 parts of N-vinyl pyrrolidone and 0.1 part of 2,2'-azobis(2,4-dimethyl valeronitrile) was contained in an ampule, which was sealed after deaeration and evacuation under freezing of the mixture therein. The mixture was then heated at 50° C. to effect polymerization for 8 hours to obtain copolymer 5. The transition temperature of the copolymer 5 was 36° C.

Preparation Example 6

A mixture of 95 parts of an acrylic acid ester of dimethylpropylamine with 4 moles of ethylene oxide added thereto, 5 parts of methyl methacrylate and 1 part of 2,2'-azobis(2,4-dimethyl valeronitrile) was contained in an ampule, which was sealed after deaeration and evacuation under freezing of the mixture therein. The mixture was then heated at 50° C. to effect polymerization for 8 hours to obtain copolymer 6. The transition temperature of the copolymer 6 was 44° C.

Preparation Example 7

A mixture of 98 parts of an acrylic acid ester of dimethylpropylamine with 4 moles of ethylene oxide added thereto, 2 parts of methyl methacrylate and 1 part of 2,2'-azobis(2, 4-dimethyl valeronitrile) was contained in an ampule, which was sealed after deaeration and evacuation under freezing of the mixture therein. The mixture was then heated at 50° C. to effect polymerization for 8 hours to obtain copolymer 7. The transition temperature of the copolymer 7 was 58° C.

Example 1

A uniform aqueous blend of the copolymer 1 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 80° to 60° C. at a rate of 2° C. per minute. The results are shown in Table 1.

TABLE 1

| Temperature (°C.) | 25 → | 35 → | 45 → | 55 → | 65 → | 75 → |
|---|---|---|---|---|---|---|
| Viscosity (cps) | 400 → | 300 → | 200 → | 120 → | 100 → | >18000 → |
| Note | | | | | | Gelation |
| (°C.) | 85 → | 80 → | 75 → | 70 → | 65 → | 60 |
| (cps) | >18000 → | >18000 → | >18000 → | 1100 → | 120 → | 120 |
| | Gelation | Gelation | Gelation | | | |

Example 2

A uniform aqueous blend of the copolymer 2 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 60° to 40° C. at a rate of 2° C. per minute. The results are shown in Table 2.

TABLE 2

| Temperature (°C.) | 30 → | 35 → | 40 → | 45 → | 50 → | 55 → |
|---|---|---|---|---|---|---|
| Viscosity (cps) | 250 → | 200 → | 160 → | 120 → | 120 → | >18000 → |
| Note | | | | | | Gelation |
| (°C.) | 60 → | 55 → | 50 → | 45 → | 40 | |
| (cps) | >18000 → | >18000 → | 300 → | 240 → | 160 | |
| | Gelation | Gelation | | | | |

Example 3

A uniform aqueous blend of the copolymer 3 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 50° to 30° C. at a rate of 2° C. per minute. The results are shown in Table 3.

TABLE 3

| Temperature (°C.) | 20 → | 25 → | 30 → | 35 → | 40 → | 45 → |
|---|---|---|---|---|---|---|
| Viscosity (cps) | 180 → | 150 → | 120 → | 90 → | 100 → | >18000 → |
| Note | | | | | | Gelation |
| (°C.) | 50 → | 45 → | 40 → | 35 → | 30 | |
| (cps) | >18000 → | >18000 → | 200 → | 120 → | 120 | |
| | Gelation | Gelation | | | | |

Example 4

A uniform aqueous blend of the copolymer 4 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 65° to 45° C. at a rate of 2° C. per minute. The results are shown in Table 4.

TABLE 4

| Temperature (°C.) | 35 → | 40 → | 45 → | 50 → | 55 → | 60 → |
|---|---|---|---|---|---|---|
| Viscosity (cps) | 350 → | 320 → | 280 → | 240 → | 200 → | >18000 → |

TABLE 4-continued

| Note | | | | | | | | | Gelation |
|---|---|---|---|---|---|---|---|---|---|
| (°C.) | 65 | → | 60 | → | 55 | → | 50 | → | 45 |
| (cps) | >18000 | → | >18000 | → | 550 | → | 250 | → | 280 |
| | Gelation | | Gelation | | | | | | |

Example 5

A uniform aqueous blend of the copolymer 5 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 45° C. to 20° C. at a rate of 2° C. per minute. The results are shown in Table 5.

viscometer with a ST rotor while it was being heated at a rate of temperature elevation of 2° C. per minute to effect thickening thereof, and then cooled down from 75° C. to 30° C. at a rate of 2° C. per minute. The results are shown in Table 7.

TABLE 5

| Temperature (°C.) | 20 | → | 25 | → | 30 | → | 35 | → | 40 | → | 45 | → | |
|---|---|---|---|---|---|---|---|---|---|---|---|---|---|
| Viscosity (cps) | 250 | → | 220 | → | 190 | → | 180 | → | >18000 | → | >18000 | → | |
| Note | | | | | | | | | Gelation | | Gelation | | |
| (°C.) | 50 | → | 45 | → | 40 | → | 35 | → | 30 | → | 25 | → | 20 |
| (cps) | >18000 | → | >18000 | → | >18000 | → | 1900 | → | 300 | → | 220 | → | 250 |
| | Gelation | | Gelation | | Gelation | | | | | | | | |

Example 6

A uniform aqueous blend of the copolymer 6 was prepared by dissolving 20 parts thereof into 80 parts of deionized water at 20° C. Thereafter, the viscosity change of the aqueous mixture was measured using a Brookfield-type viscometer with a ST rotor while it was being heated at a rate of temperature elevation of 2° C. per minute to effect thickening thereof, and then cooled down from 55° C. to 30° C. at a rate of 2° C. per minute. The results are shown in Table 6.

TABLE 6

| Temperature (°C.) | 25 | → | 30 | → | 35 | → | 40 | → | 45 | → | 50 | → |
|---|---|---|---|---|---|---|---|---|---|---|---|---|
| Viscosity (cps) | 100 | → | 90 | → | 75 | → | 60 | → | 70 | → | >18000 | → |
| Note | | | | | | | | | | | Gelation | |
| (°C.) | 55 | → | 50 | → | 45 | → | 40 | → | 35 | → | 30 | |
| (cps) | >18000 | → | >18000 | → | 1000 | → | 100 | → | 75 | → | 90 | |
| | Gelation | | Gelation | | | | | | | | | |

Example 7

A uniform aqueous blend of the copolymer 7 was prepared by dissolving 20 parts thereof into 80 parts of deionized water at 20° C. Thereafter the viscosity change of the aqueous mixture was measured using a Brookfield-type

TABLE 7

| Temperature (°C.) | 40 | → | 45 | → | 50 | → | 55 | → | 60 | → | 65 | → |
|---|---|---|---|---|---|---|---|---|---|---|---|---|
| Viscosity (cps) | 110 | → | 90 | → | 70 | → | 55 | → | 60 | → | >18000 | → |
| Note | | | | | | | | | | | Gelation | |
| (°C.) | 70 | → | 65 | → | 60 | → | 55 | → | 50 | → | 45 | |
| (cps) | >18000 | → | >18000 | → | 1000 | → | 80 | → | 75 | → | 90 | |
| | Gelation | | Gelation | | | | | | | | | |

Example 8

A blend of 99.8 parts of a urethane resin emulsion (U-Coat UX4300 manufactured by Sanyo Chemical Co., Ltd.) with a solid content of 40% and 0.2 parts of the copolymer 1 obtained in Preparation Example 1 was prepared by dissolving and uniformly mixing at 20° C. Thereafter the viscosity change of the emulsion thus obtained was measured using a Brookfield-type viscometer with a ST rotor while it was being heated at a rate of temperature elevation of 2° C. per minute to effect thickening thereof, and then cooled down from 80° C. to 60° C. at a rate of 2° C. per minute. The results are shown in Table 8.

TABLE 8

| Temperature (°C.) | 55 → | 60 → | 65 → | 70 → | 75 → | 80 → |
|---|---|---|---|---|---|---|
| Viscosity (cps) | 500 → | 400 → | 300 → | 220 → | 200 → | >18000 → |
| Note | | | | | | Gelation |
| (°C.) | 85 → | 80 → | 75 → | 70 → | 65 → | 60 |
| (cps) | >18000 → | >18000 → | >18000 → | 1000 → | 400 → | 400 |
| | Gelation | Gelation | Gelation | | | |

Example 9

A blend of 99.8 parts of an acrylic resin emulsion (Primal AC-16 manufactured by Rohm & Haas Co.) with a solid content of 40% and 0.2 parts of the copolymer 4 obtained in Preparation Example 4 was prepared by dissolving and uniformly mixing at 20° C. Thereafter the viscosity change of the emulsion thus obtained was measured using a Brookfield-type viscometer with a ST rotor while it was being heated at a rate of temperature elevation of 2° C. per minute, and then cooling down from 65° C. to 45° C. at a rate of 2° C. per minute. The results are shown in Table 9.

TABLE 9

| Temperature (°C.) | 35 → | 40 → | 45 → | 50 → | 55 → | 60 → |
|---|---|---|---|---|---|---|
| Viscosity (cps) | 250 → | 220 → | 180 → | 140 → | 130 → | >18000 → |
| Note | | | | | | Gelation |
| (°C.) | 65 → | 60 → | 55 → | 50 → | 45 | |
| (cps) | >18000 → | >18000 → | 350 → | 150 → | 180 | |
| | Gelation | Gelation | | | | |

Examples 10 and 11 and Comparative Examples 1 and 2

A white paint composition was obtained by blending 25 parts of a urethane resin emulsion containing the copolymer 1 as prepared in Example 8, 10 parts of titanium oxide, 5 parts of water and 0.1 part of sodium polyacrylate dispersant (20% aqueous solution), and by dispersing together with 80 parts of glass beads for 30 minutes using a painting conditioner (White Paint Composition 1 of Example 10). For the sake of comparison, a white paint composition was prepared in the same way as in Example 10 except that the above-mentioned urethane resin emulsion not containing the copolymer 1 was used (White Paint Composition 2 of Comparative Example 1).

In the same manner, a white paint composition was obtained by blending 25 parts of an acrylic resin emulsion containing the copolymer 4 as prepared in Example 9, 10 parts of titanium oxide, 5 parts of water and 0.1 part of sodium polyacrylate dispersant (20% aqueous solution), and by dispersing together with 80 parts of glass beads for 30 minutes using a paint conditioner (White Paint Composition 3 of Example 11). For the sake of comparison, a white paint composition was prepared in the same way as in Example 11 except that the above-mentioned acrylic resin emulsion not containing the copolymer 4 was used (White Paint Composition 4 of Comparative Example 2).

The white paint compositions 1–4 obtained were applied each with an applicator to a glass plate by a thickness of 100 μm and, after having been kept in air for 5 minutes, dried at 130° C. in a circulating hot air oven for 20 minutes. The external appearance of the coatings was subjected to a visual inspection. The results are shown in Table 10.

TABLE 10

| | White Paint Composition | Appearance of Coating[*1] |
|---|---|---|
| Example 10 | 1 | O |
| Comparative Example 1 | 2 | X |
| Example 11 | 3 | O |
| Comparative Example 2 | 4 | X |

[*1] O; Coating uniform without defects such as poppings
X; Coating not uniform with defects such as poppings The thermoreversible thickener of the invention has a characteristic over a wide temperature range that the addition thereof to an aqueous liquid causes decrease in viscosity in the temperature range below the transition temperature, while subsequent heating causes a rapid increase in viscosity at the transition temperature, and that the viscosity change is repeated with thermoreversibility. Furthermore, the copolymer in the thickener of the invention has an advantage such that the transition temperature thereof can be controlled easily and optionally by varying the kinds and the moles of the alkylene oxides in the vinyl carboxylic esters constituting the copolymer, the kinds and the contents of the monomers constituting the copolymer, and the kinds and the contents of the comonomers constituting the copolymer.

Accordingly, the thickener of the invention can be used in such a useful way that the addition thereof to aqueous liquid such as water, aqueous solutions of water soluble compounds, aqueous solutions of water soluble resins, aqueous dispersions of inorganic substances and aqueous dispersions of organic substances such as latices and various resin emulsions is effective in controlling the viscosity characteristics of the aqueous liquids, causing thickening and immobilization thereof with thermoreversibility, thus enabling to improve the performance of industrial products such as paints, coating materials, inks, adhesives, pressure sensitive adhesives, textile printing sizes, binders for non-woven fabrics, coating materials for coated paper, oils for metals, binders for cosmetics, resin mortar and cement, adhesives for carpet backing and binders for coated paper.

I claim:

1. A thermoreversible thickener, which comprises a water-soluble copolymer comprising, as constituent monomers, (1) at least 50% by weight of one or more esters of a vinyl carboxylic acid with an adduct, selected from the group consisting of an adduct of an alkylene oxide with a cyclic amine and an adduct of an alkylene oxide with a non-cyclic amine having at least 5 carbon atoms, the vinyl carboxylic acid being selected from the group consisting of acrylic, methacrylic, crotonic, isocrotonic, maleic, fumaric, itaconic and vinyl benzoic acids; and (2) 0 to 50% by weight of a comonomer selected from the group consisting of hydroxyethyl acrylate, hydroxyethyl methacrylate, diethylene glycol monoacrylate, diethylene glycol monomethacrylate, polyethylene glycol monoacrylate, polyethylene glycol monomethacrylate, acryloyloxy polyglycerol, methacryloyloxy polyglycerol, vinyl alcohol, allyl alcohol, acrylamide, methacrylamide, N-methyl acrylamide, N-methyl methacrylamide, N-methylol acrylamide, N-methylol methacrylamide, N-vinyl-2-pyrrolidone, vinyl imidazole, N-vinyl-ε-caprolactam, p-methanesulfonamide styrene, N-methylol maleimide, N-vinyl succinimide, p-aminostyrene, N-vinyl carbazole, 2-vinylpyridine, 2-cyanoethyl acrylate, 2-cyanoethyl methacrylate, acrylic acid, methacrylic acid, maleic acid, maleic anhydride, fumaric acid, itaconic acid, vinyl sulfonic acid, allyl sulfonic acid, methallyl sulfonic acid, styrene sulfonic acid, vinyl benzoic acid, alkyl allyl sulfosuccinic ester, acryloyl polyoxyalkylene sulfuric ester, methacryloyl polyoxyalkylene sulfuric ester, salts of these acids, N,N-dimethylaminoethyl acrylate, N,N-dimethylaminoethyl methacrylate, N,N-dimethylaminopropyl acrylate, N,N-dimethylaminopropyl methacrylate, N,N-diethylaminoethyl acrylate, N,N-diethylaminoethyl methacrylate, N,N-diethylaminopropyl acrylate, N,N-diethylaminopropyl methacrylate, N,N-dimethylaminoethyl acrylamide, N,N-dimethylaminoethyl methacrylamide, vinyl aniline, salts of these amines, 1,1,1-trimethylamine acrylimide, 1,1,1-trimethylamine methacrylimide, 1,1-dimethyl-1-ethylamine acrylimide, 1,1-dimethyl-1-ethylamine methacrylimide, 1,1-dimethyl-1- (2 -hydroxypropyl) amine acrylimide, 1,1-dimethyl-1-(2-hydroxypropylamine methacrylimide, 1,1-dimethyl-1-(2'-phenyl-2'-hydroxyethyl)amine acrylimide, 1,1-dimethyl-1-(2'-phenyl-2'-hydroxyethyl)amine methacrylimide, 1,1,1-trimethylamine acryl-imide, 1,1,1-trimethylamine methacrylimide, methyl acrylate, methyl methacrylate, ethyl acrylate, ethyl methacrylate, butyl acrylate, butyl methacrylate, cyclohexyl acrylate, cyclohexyl methacrylate, lauryl methacrylate, octadecyl methacrylate, glycidyl acrylate, glycidyl methacrylate, N,N-dibutylacrylamide, N,N-dibutylacrylamide, N-cyclohexylacrylamide, acrylonitrile, methacrylonitrile, styrene, 1-methylstyrene, vinyl acetate, butadiene, chlorovinyl butadiene and isoprene, the amount of the comonomer being selected within the above range in such a proportion providing water-soluble copolymer;

said copolymer being capable of reversibly controlling the viscosity of an aqueous liquid in the Ph range of from 3 to 12 in response to a change in temperature.

2. The thermoreversible thickener of claim 1, wherein said water-soluble copolymer further comprises a comonomer which is a hydrophilic vinyl monomer which is different from said vinyl carboxylic ester.

3. The thermoreversible thickener of claim 1, wherein said water-soluble copolymer further comprises a comonomer which is a oleophilic vinyl monomer.

4. The thermoreversible thickener of claim 1, wherein said water-soluble copolymer further comprises a comonomer which is a hydrophilic vinyl monomer and a comonomer which is an oleophilic vinyl monomer.

5. The thermoreversible thickener of claim 1, wherein said copolymer has a reversible hydrophilicity/hydrophobicity transition temperature of from 30° C. to 95° C.

6. The thermoreversible thickener of claim 1, wherein the cyclic amine is a non-aromatic heterocyclic amine.

7. The thermoreversible thickener of claim 1, wherein the cyclic amine is selected from the group consisting of piperidines and morpholines.

8. The thermoreversible thickener of claim 1, wherein the adduct of said alkylene oxide with said non-cyclic amine having at least 5 carbon atoms comprises a primary aliphatic non-cyclic amine having 5 to 8 carbons with from 2 to 5 moles of an alkylene oxide.

9. The thermoreversible thickener of claim 1, wherein the alkylene oxide is ethylene oxide, propylene oxide, or a combination thereof.

10. The thermoreversible thickener of claim 1, wherein said adduct comprises from 1 to 5 moles of alkylene oxide.

11. The thermoreversible thickener of claim 1, wherein the vinyl carboxylic acid is acrylic acid, methacrylic acid, maleic acid, or vinyl benzoic acid.

12. A composition comprising from 0.01 to 30% by weight of the thermoreversible thickener of claim 1, and from 70 to 99.99% by weight of an aqueous solution, emulsion, or aqueous dispersion of an inorganic or organic substance; said composition being capable of thickening upon heating to a temperature above the transition temperature of said copolymer.

13. A method of thickening aqueous solutions, emulsions, or aqueous dispersions consisting essentially of adding the thermoreversible thickener of claim 1 to said aqueous solution, emulsion, or aqueous dispersion, and adjusting the temperature of the resulting mixture until the desired viscosity is obtained.

14. A coating material composition comprising from 0.01 to 30% by weight of the thermoreversible thickener of claim 1.

15. A rolling oil composition comprising from 0.01 to 30% by weight of the thermoreversible thickener of claim 1.

16. An adhesive bonding agent comprising from 0.01 to 30% by weight of the thermoreversible thickener of claim 1.

17. A printing ink comprising from 0.01 to 30% by weight of the thermoreversible thickener of claim 1.

18. A coating material for coated papers comprising from 0.01 to 30% by weight of the thermoreversible thickener of claim 1.

19. A binder for nonwoven fabrics comprising from 0.01 to 30% by weight of the thermoreversible thickener of claim 1.

20. An adhesive for carpet backing comprising from 0.01 to 30% by weight of the thermoreversible thickener of claim 1.

21. A thermoreversible thickener, which comprises a water-soluble copolymer comprising, as constituent monomers, (1) at least 50% by weight of one or more esters of a vinyl carboxylic acid with an adduct, selected from the group consisting of an adduct of an alkylene oxide with a cyclic amine and an adduct of an alkylene oxide with a non-cyclic amine having at least 5 carbon atoms, the vinyl carboxylic acid being selected from the group consisting of acrylic, methacrylic, crotonic, isocrotonic, maleic, fumaric, itaconic and vinyl benzoic acids; and (2) 0 to 50% by weight of a comonomer selected from the group consisting of hydroxyethyl acrylate, hydroxyethyl methacrylate, diethylene glycol monoacrylate, diethylene glycol monomethacrylate, polyethylene glycol monoacrylate, polyethylene glycol monomethacrylate, acryloyloxy polyglycerol, methacryloyloxy polyglycerol, vinyl alcohol, allyl alcohol, acrylamide, methacrylamide, N-methyl acrylamide, N-methyl methacrylamide, N-methylol acrylamide, N-methylol methacrylamide, N-vinyl-2-pyrrolidone, vinyl imidazole, N-vinyl-ε-caprolactam, p-methanesulfonamide styrene, N-methylol maleimide, N-vinyl succinimide, p-aminostyrene, N-vinyl carbazole, 2-vinylpyridine, 2-cyanoethyl acrylate, 2-cyanoethyl methacrylate, acrylic acid, methacrylic acid, maleic acid, maleic anhydride, fumaric acid, itaconic acid, vinyl sulfonic acid, allyl sulfonic acid, methallyl sulfonic acid, styrene sulfonic acid, vinyl benzoic acid, alkyl allyl sulfosuccinic ester, acryloyl polyoxyalkylene sulfuric ester, methacryloyl polyoxyalkylene sulfuric ester, salts of these acids, N,N-dimethylaminoethyl acrylate, N,N-dimethylaminoethyl methacrylate, N,N-dimethylaminopropyl acrylate, N,N-dimethylaminopropyl methacrylate, N,N-diethylaminoethyl acrylate, N,N-diethylaminoethyl methacrylate, N,N-diethylaminopropyl acrylate, N,N-diethylaminopropyl methacrylate, N,N-dimethylaminoethyl acrylamide, N,N-dimethylaminoethyl methacrylamide, vinyl aniline, salts of these amines, 1,1,1-trimethylamine acrylimide, 1,1,1-trimethylamine methacrylimide, 1,1-dimethyl-1-ethylamine acrylimide, 1,1-dimethyl-1-ethylamine methacrylimide, 1,1-dimethyl-1-(2-hydroxypropyl) amine acrylimide, 1,1-dimethyl-1-(2-hydroxypropyl) amine methacrylimide, 1,1-dimethyl-1-(2'-phenyl-2'-hydroxyethyl)amine acrylimide, 1,1-dimethyl-1-(2'-phenyl-2'-hydroxyethyl)amine methacrylimide, 1,1,1-trimethylamine acrylimide, 1,1,1-trimethylamine methacrylimide, methyl acrylate, methyl methacrylate, ethyl acrylate, ethyl methacrylate, butyl acrylate, butyl methacrylate, cyclohexyl acrylate, cyclohexyl methacrylate, lauryl methacrylate, octadecyl methacrylate, glycidyl acrylate, glycidyl methacrylate, N,N-dibutylacrylamide, N-cyclohexylacrylamide, acrylonitrile, methacrylonitrile, styrene, 1-methylstyrene, vinyl acetate, butadiene, chlorovinyl butadiene and isoprene, the amount of the comonomer being selected within the above range in such a proportion providing water-soluble copolymer; said copolymer having a thermoreversible transition temperature, below which the copolymer is soluble in water and above which an aqueous solution thereof exhibits thickening effects, the thermoreversible transition temperature having been controlled to a temperature in the range of 5° to 95° C.

22. The thermoreversible thickener of claim 1, wherein said copolymer is a copolymer of vinyl carboxylic esters of said amines or a copolymer comprising, as constituent monomers, at least 50% by weight of said vinyl carboxylic esters together with a copolymerizable vinyl monomer different from said vinyl carboxylic esters.

23. The thermoreversible thickener of claim 1, wherein said copolymer contains said vinyl carboxylic ester in an amount of 50 to 98% by weight, based upon the total thickener.

24. The thermoreversible thickener of claim 1, wherein said cyclic amine is morpholine.

25. A method of thickening an aqueous solution, emulsion, or dispersion, which comprises heating an aqueous solution, emulsion, or dispersion containing the thermoreversible thickener of claim 21 to a temperature above the transition temperature of said copolymer.

26. The method of claim 25, wherein the aqueous solution, emulsion, or dispersion is prepared by adding said thermoreversible thickener to an aqueous solution, emulsion, or dispersion at a temperature below the transition temperature of said copolymer.

27. The thickener of claim 1, wherein said cyclic amine is selected from the group consisting of aziridines, pyrrolidines, piperidines, piperazines, morpholines, pyrrolines, pyrazolines, imidazoles, pyrazoles, pyridones, ε-caprolactam, pyridazinone, pyridaline, pyridoine, aromatic heterocyclic amines and aromatic amines.

28. The thickener of claim 1, wherein said cyclic amine is piperidine.

29. The thickener of claim 1, wherein said non-cyclic amine is selected from the group consisting of dimethylpropyl amine, 2-ethylbutyl amine, pentyl amine, 2,2-dimethylbutyl amine, hexyl amine, cyclohexyl amine, octyl amine, 2-ethylhexyl amine, isodecyl amine, lauryl amine, methyl butyl amine, methyl isobutyl amine, methyl t-butyl amine, methyl pentyl amine, methyl hexyl amine, methyl 2-ethylhexyl amine, methyl octyl amine, methyl nonyl amine, methyl iso-decyl amine, ethyl propyl amine, ethyl iso-propyl amine, ethyl butyl amine, ethyl iso-butyl amine, ethyl t-butyl amine, ethyl pentyl amine, ethyl hexyl amine, ethyl 2-ethylhexyl amine, ethyl octyl amine, dipropyl amine, di-iso-propyl amine, propyl butyl amine, propyl iso-butyl amine, propyl t-butyl amine, propyl pentyl amine, propyl hexyl amine, propyl 2-ethylhexyl amine, propyl octyl amine, iso-propyl butyl amine, iso-propyl iso-butyl amine, iso-propyl t-butyl amine, iso-propyl pentyl amine, iso-propyl hexyl amine, iso-propyl 2-ethylhexyl amine, iso-propyl octyl amine, dibutyl amine, di-iso-butyl amine, di-t-butyl amine, butyl pentyl amine, dipentyl amine and dicyclohecyl amine.

30. The thickener of claim 1, wherein said non-cyclic amine is dimethylpropyl amine.

31. The thickener of claim 1, wherein the vinyl carboxylic acid is acrylic acid or methacrylic acid.

32. The thickener of claim 1, wherein the comonomer selected from the group consisting of hydroxyethyl acrylate, hydroxyethyl methacrylate, acrylamide, N-vinyl-2-pyrrolidone, acrylic acid, methacrylic acid, methyl acrylate, methyl methacrylate, ethyl acrylate, ethyl methacrylate, butyl acrylate, butyl methacrylate, N,N-dimethylaminoethyl acrylate, N,N-dimethylaminoethyl methacrylate and styrene.

33. The thickener of claim 1, wherein the water-soluble copolymer comprises at least 70% by weight of said ester and 0 to 30% by weight of the comonomer.

34. The thickener of claim 1, wherein the water-soluble copolymer has a weight-average molecular weight from 1,000 to 5,000,000.

35. A method for thickening an aqueous solution, emulsion or dispersion, which method comprises adding the thermoreversible thickener of claim 21 to said aqueous solution, emulsion or dispersion at a temperature below the transition temperature of the water-soluble copolymer, and then heating up the resulting mixture to a temperature above the transition temperature of the water-soluble copolymer to exhibit thickening effects.

* * * * *